(12) United States Patent
Moita (10) Patent No.: US 9,578,812 B2
(45) Date of Patent: Feb. 28, 2017

(54) CURB FOR LANDSCAPING (71) Applicant: Jose M Moita, Edmonton (CA)

(72) Inventor: Jose M Moita, Edmonton (CA)

(*) Notice: Subject to any disclaimer, the term of this patent is extended or adjusted under 35 U.S.C. 154(b) by 0 days.

(21) Appl. No.: 14/662,658

(22) Filed: Mar. 19, 2015

(65) Prior Publication Data

US 2015/0282434 A1 Oct. 8, 2015

(30) Foreign Application Priority Data

Apr. 2, 2014 (CA) ...................................... 2847893

(51) Int. Cl.
*A01G 1/08* (2006.01)
*F21V 33/00* (2006.01)
*F21V 31/03* (2006.01)
*F21W 131/109* (2006.01)
*F21W 121/00* (2006.01)
*F21Y 101/00* (2016.01)

(52) U.S. Cl.
CPC ................ *A01G 1/08* (2013.01); *F21V 31/03* (2013.01); *F21V 33/008* (2013.01); *F21W 2121/00* (2013.01); *F21W 2131/109* (2013.01); *F21Y 2101/00* (2013.01)

(58) Field of Classification Search
CPC ... A01G 1/08; F21V 33/008; F21W 2131/109
See application file for complete search history.

(56) References Cited

U.S. PATENT DOCUMENTS

| | | | | |
|---|---|---|---|---|
| 3,803,760 A * | 4/1974 | Matvey | ............................. | 47/33 |
| RE33,550 E * | 3/1991 | Jones | ................................. | 404/7 |
| 5,073,061 A * | 12/1991 | Jones | ................................. | 404/7 |
| 5,092,076 A * | 3/1992 | Terreta | ..................... | A01G 1/08 47/33 |
| 5,157,867 A | 10/1992 | Fritch | | |
| 5,377,447 A * | 1/1995 | Fritch | ................................ | 47/33 |
| 5,544,445 A * | 8/1996 | Mantilla | ........................... | 47/33 |
| 5,930,947 A * | 8/1999 | Eckhoff | ............................ | 47/33 |
| 5,956,892 A * | 9/1999 | Kownacki | ................ | A01G 1/08 239/276 |
| 6,625,925 B1 | 9/2003 | Foster | | |
| 6,767,159 B2 * | 7/2004 | Jones | ................................. | 404/7 |

(Continued)

FOREIGN PATENT DOCUMENTS

| | | | | |
|---|---|---|---|---|
| DE | 19501109 A1 * | 7/1996 | ............... | A01G 1/08 |
| FR | EP 2281438 A1 * | 2/2011 | ............... | A01G 1/08 |

*Primary Examiner* — Jeanette E Chapman
(74) *Attorney, Agent, or Firm* — Davis & Bujold PLLC; Michael J. Bujold (57) ABSTRACT There is provided a curb for landscaping having a base portion, a cover portion, a curb front end and a curb rear end. The base portion has a top surface and a flat bottom surface. The cover portion has an outer surface and an inner surface. The base portion and the cover portion have front and rear edges, and these front edges are attached to define the curb front end. The cover portion overlies and extends above the base portion such that the rear edges are spaced apart. The curb rear end has one or more drainage openings above the top surface of the base portion, and the curb front end has one or more drainage outlets adjacent to and above the front edge of the base portion, the drainage outlets being in fluid communication with the drainage openings and permitting water to drain through the curb body.

39 Claims, 11 Drawing Sheets (56) References Cited

U.S. PATENT DOCUMENTS

| | | | | |
|---|---|---|---|---|
| 8,322,087 | B1* | 12/2012 | Lascano | E02D 31/002 404/7 |
| 2006/0236601 | A1* | 10/2006 | Barber | A01G 1/08 47/33 |
| 2010/0101673 | A1* | 4/2010 | Cornwall | E03C 1/12 137/896 |

* cited by examiner

CURB FOR LANDSCAPING

TECHNICAL FIELD

This relates to a curb for landscaping, such as may be used to retain landscaping material.

BACKGROUND

Landscape edging is used in landscape applications in order to, for example, define raised garden beds or other ornamental features or to separate garden areas. Landscape edging lends definition and structure to landscape features, and is both ornamental and practical.

SUMMARY

According to an aspect, there is provided a curb for landscaping. The curb has a base portion, a cover portion, a curb front end and a curb rear end. The base portion has a top surface and a bottom surface, the bottom surface being flat. The cover portion has an outer surface and an inner surface. Each of the base portion and the cover portion have front and rear edges, the front edge of the base portion being attached to the front edge of the cover portion and defining the curb front end. The cover portion overlies and extends above the base portion from the curb front end such that the rear edge of the cover portion is spaced above the rear edge of the base portion. The curb rear end has one or more drainage openings above the top surface of the base portion. The curb front end has one or more drainage outlets adjacent to and above the front edge of the base portion, the one or more drainage outlets being in fluid communication with the one or more drainage openings and permitting water to drain through the curb body.

According to another aspect, the one or more drainage openings may be one opening defined by the rear edge of the base portion and the cover portion and the curb body is hollow.

According to another aspect, the cover portion and the base portion may be connected by a support bracket, the support bracket resisting movement of the cover portion toward the base portion.

According to another aspect, the support bracket may be a join bracket, the join bracket having first and second attachments that permit connections between adjoining lengths of curb.

According to another aspect, the cover portion may have a recess to receive a lighting device.

According to another aspect, the base portion may be attached to a ground surface with nails passing through the base portion.

According to another aspect, the base portion may have straps extending past the front edge.

According to another aspect, the curb may further have an attachment cavity along the curb front end and an insert that is sized to be received within the attachment cavity, the insert permitting the curb to be attached to adjoining lengths of curb.

According to another aspect, adjoining lengths of curb may be attached with a clip seam, the clip seam covering the outer surface of the cover portion at a seam between adjoining lengths of curb.

According to another aspect, the curb may be constructed through injection moulding, blow moulding, pultrusion or extrusion.

According to another aspect, the curb may be made from materials selected from a group consisting of steel, aluminium, sheet metal, galvanized steel, plastic, rubber, or composite materials.

According to another aspect, the front portion may comprise a decorative insert covering the outer surface.

According to an aspect, there is provided a method of creating a landscape feature, the method having the steps of providing a curb for landscaping to define the borders of an area to be landscaped, assembling the curb such that the one or more drainage openings open toward the area to be landscaped, and depositing a landscaping material on the area to be landscaped. The curb has a base portion with a top surface and a bottom surface, the bottom surface being flat, a cover portion having an outer surface and an inner surface. Each of the base portion and the cover portion have front and rear edges, the rear edges of the base portion and the cover portion defining a curb rear end and the front edge of the base portion being attached to the front edge of the cover portion and defining a curb front end, the cover portion overlying and extending above the base portion from the curb front end such that the rear edge of the cover portion is spaced above the rear edge of the base portion. The curb has one or more drainage openings in the curb rear end and above the top surface of the base portion and one or more drainage outlets in the curb front end adjacent to and above the front edge of the base portion, the one or more drainage outlets being in fluid communication with the one or more drainage openings and permitting water to drain through the curb body.

According to another aspect, the one or more drainage openings may be one opening defined by the rear edge of the base portion and the cover portion and the curb body is hollow.

According to another aspect, the landscaping material may be further deposited in the cavity of the curb for landscaping.

According to another aspect, the method may have the further step of connecting the cover portion and the base portion using a support bracket, the support bracket resisting movement of the cover portion toward the base portion.

According to another aspect, the support bracket may be a join bracket, the join bracket comprising first and second attachments that permit connections between adjoining lengths of curb.

According to another aspect, the cover portion may have a recess to receive a lighting device.

According to another aspect, the method may have the further step of attaching the base portion to a ground surface with nails passing through the base portion.

According to another aspect, the base portion may have straps extending past the front edge.

According to another aspect, the curb may have an attachment cavity along the curb front end and an insert that is sized to be received within the attachment cavity, the insert permitting the curb to be attached to adjoining lengths of curb.

According to another aspect, the method may have the further step of attaching adjoining lengths of curb with a clip seam, the clip seam covering the outer surface of the cover portion at a seam between adjoining lengths of curb.

According to another aspect, the curb may be constructed through one of injection moulding, extrusion, blow moulding and pultrusion.

According to another aspect, the curb may be made from materials selected from a group consisting of steel, aluminium, sheet metal, galvanized steel, plastic, rubber, or composite materials According to another aspect, the front portion may have a decorative insert covering the outer surface.

According to an aspect, there is provided a curb system for landscaping. The curb system involves providing a plurality of lengths of landscaping curb, each length of landscaping curb having a base portion with a top surface and a bottom surface, the bottom surface being flat, a cover portion having an outer surface and an inner surface, and each of the base portion and the cover portion having front and rear edges the rear edges of the base portion and the cover portion defining a curb rear end and the front edge of the base portion being attached to the front edge of the cover portion and defining a curb front end, the cover portion overlying and extending above the base portion from the curb front end such that the rear edge of the cover portion is spaced above the rear edge of the base portion. Each length of landscaping curve has one or more drainage openings in the curb rear end and above the top surface of the base portion and at least one of the lengths of landscaping curb comprises one or more drainage outlets in the curb front end, adjacent to and above the front edge of the base portion, the one or more drainage outlets being in fluid communication with the one or more drainage openings and permitting water to drain from the curb system.

According to another aspect, the one or more drainage openings may be one opening defined by the rear edge of the base portion and the cover portion and the curb body is hollow.

According to another aspect, the cover portion and the base portion may be connected by a support bracket, the support bracket resisting movement of the cover portion toward the base portion.

According to another aspect, the support bracket may be a join bracket, the join bracket having first and second attachments that permit connections between adjoining lengths of curb.

According to another aspect, the cover portion may have a recess to receive a lighting device.

According to another aspect, the base portion may be attached to a ground surface with nails passing through the base portion.

According to another aspect, the base portion may have straps extending past the front edge.

According to another aspect, the curb system may have an attachment cavity along the curb front end and an insert that is sized to be received within the attachment cavity, the insert permitting the curb to be attached to adjoining lengths of curb.

According to another aspect, adjoining lengths of curb may be attached with a clip seam, the clip seam covering the outer surface of the cover portion at a seam between adjoining lengths of curb.

According to another aspect, the curb may be constructed through injection moulding, extrusion, blow moulding and pultrusion.

According to another aspect, the lengths of curb may be made from materials selected from a group consisting of steel, aluminium, sheet metal, galvanized steel, plastic, rubber or composite materials.

According to another aspect, the front portion may have a decorative insert covering the outer surface.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A curb for landscaping generally identified by reference numeral 10, will now be described with reference to FIG. 1 through 9.

Figure 1:
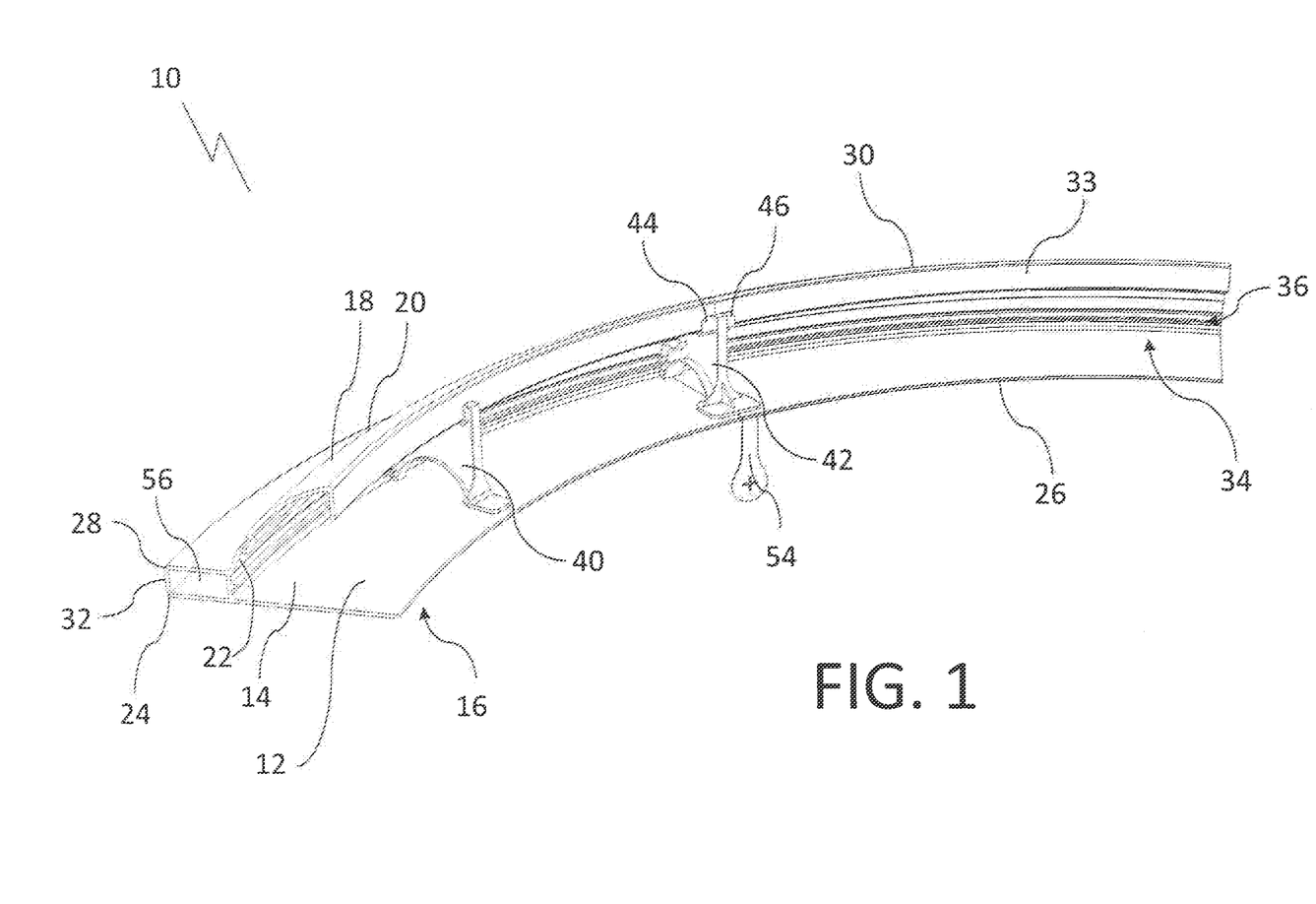
FIG. 1 is a rear perspective view of a curb for landscaping with support brackets and a strap.

Structure and Relationship of Parts:

Referring to FIG. 1, curb 10 for landscaping has a base portion 12 with a top surface 14 and a bottom surface 16. The bottom surface 16 is shown to be flat, allowing curb 10 to rest on the ground surface. Curb 10 also has a cover portion 18 with an outer surface 20 and an inner surface 22. Base portion 12 has a front edge 24 and a rear edge 26, and cover portion 18 has a front edge 28 and a rear edge 30. Front edge 24 of base portion 12 is attached to front edge 28 of cover portion 28 to define a curb front end 32. Cover portion 18 is spaced above the rear edge 26 of the base portion 12, which allows the top surface 14 of the base portion and the inner surface 22 of cover portion 18 to define a cavity 34 having an opening 36 defined by rear edge 26 of base portion 12 and rear edge 30 of cover portion 18. Curb 10 also has a rear end 33 at rear edges 26 and 30 of base portion 12 and cover portion 18. As shown, rear end 33 is open but may also be designed such that rear end 33 is mostly closed, such as with a panel (not shown) extending between rear edge 26 of base portion 12 and rear edge 30 of cover portion 18. Rear end 33 has one or more drainage openings above top surface 14 of base portion 12 that allow water to pass through curb 10. In the depicted example, the entire rear end 33 acts as a drainage opening as it is open without any obstruction. Curb 10 is preferably hollow. In a preferred embodiment, base portion 12 and cover portion 18 are also connected by a support bracket 40. Support bracket 40 provides structural support to curb 10 and resists movement of cover portion 18 towards base portion 12. Some support brackets 40 may also act to join adjacent sections together, referred to herein as join brackets 42. As will be understood, a variety of methods known in the art may be used to connect adjacent sections together, and need not use join brackets 42. Methods may be chosen based on the material used to construct the curb 10, and those skilled in the art will understand that this may vary. Adjoining lengths may also be connected using glue, screws, clips, tie straps or any other appropriate method known in the art. As curb 10 is used with landscaping, it may be beneficial to provide brackets 40 or 42 or curb 10 with clips (not shown) for engaging landscaping fabric in order to hold it in place and ensure a proper overlap between curb and the fabric is maintained when the landscaping material is installed.

Figure 4:
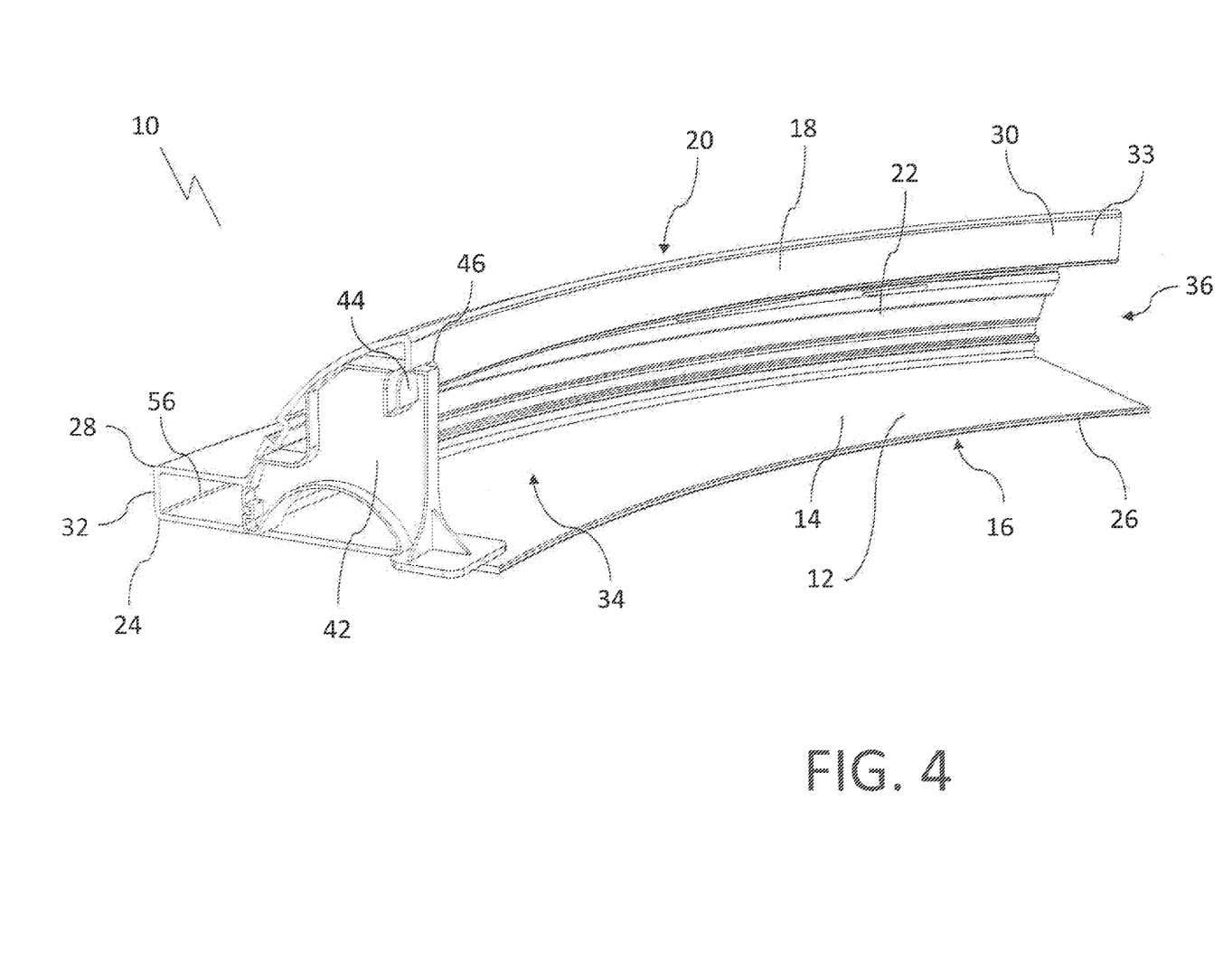
FIG. 4 is a rear perspective view of a curb for landscaping showing a join bracket.
Figure 9:
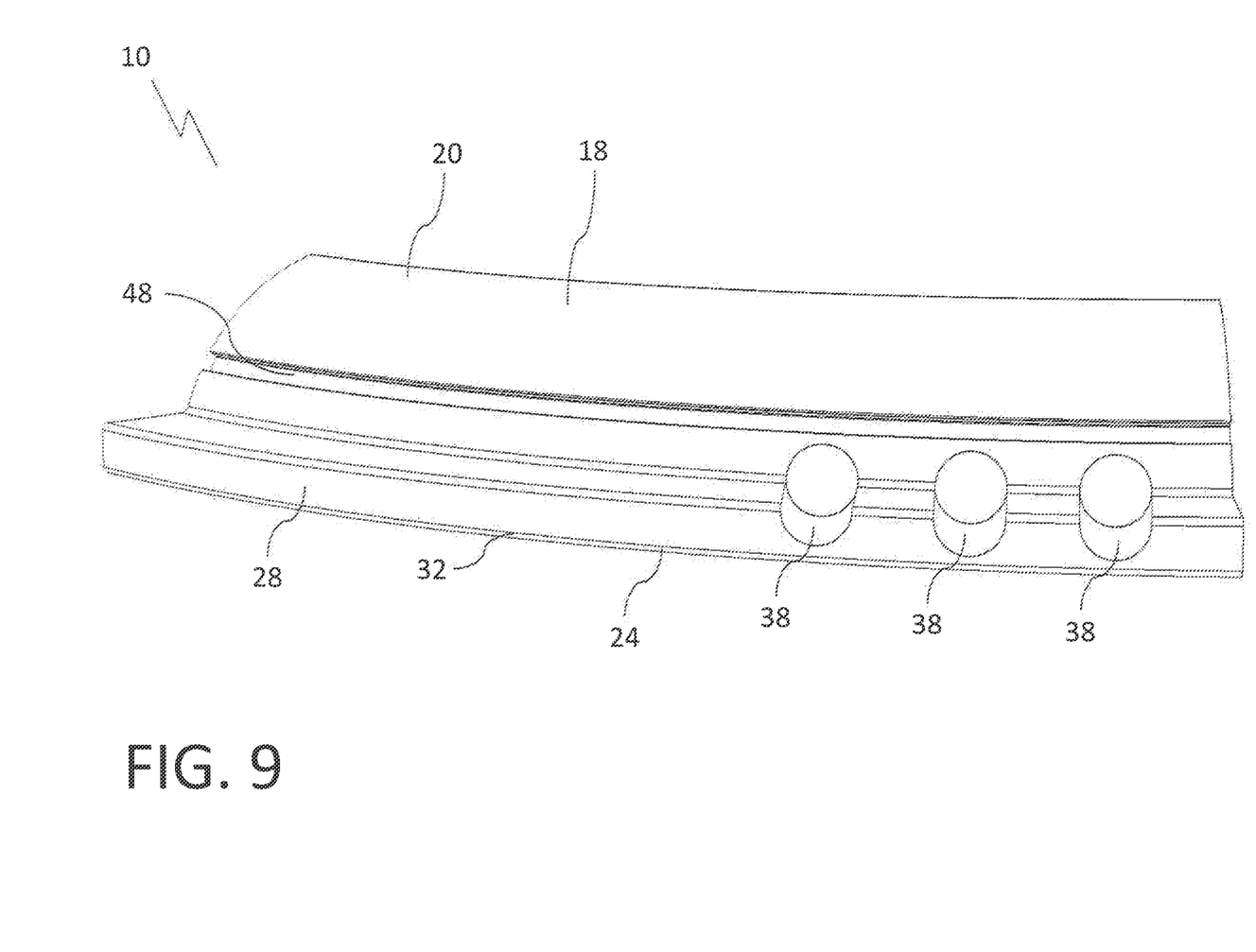
FIG. 9 is a front perspective view of a curb for landscaping with drainage outlets.
Figure 9A:
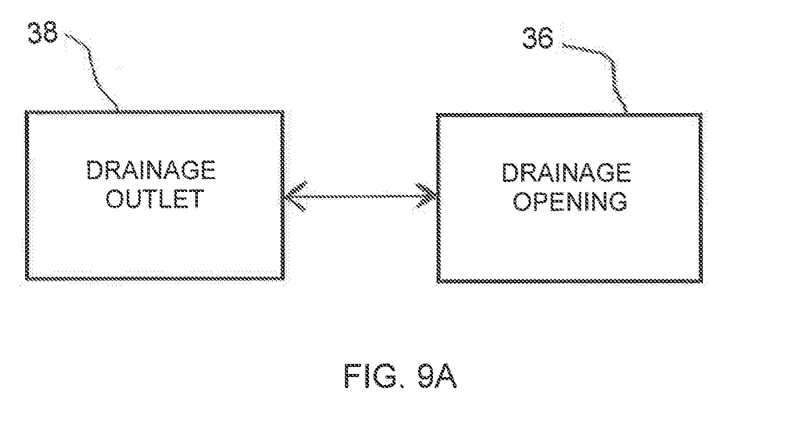
FIG. 9A is a diagrammatic view showing a drainage outlet in fluid communication with a drainage opening and permitting water to drain through the curb body.
Figure 9B:
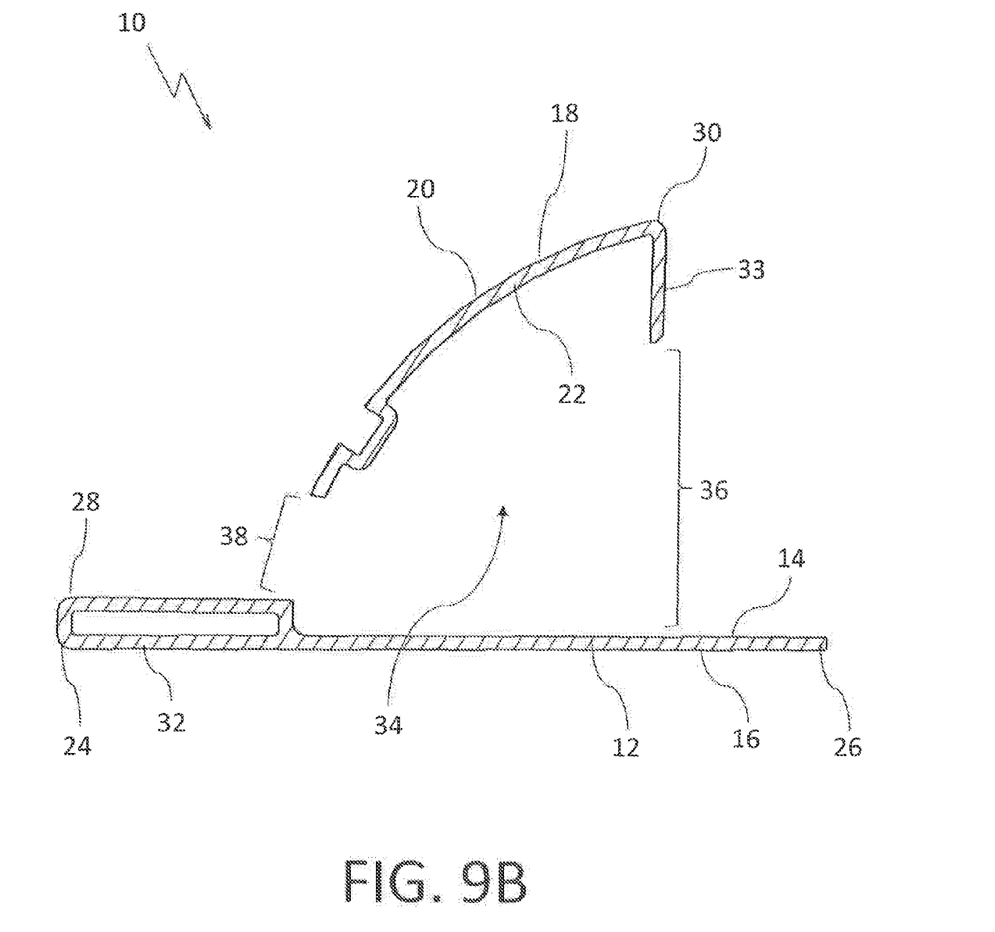
FIG. 9B is a cross-sectional view of the curb for landscaping with the drainage outlets of FIG. 9.

Referring to FIG. 4, first attachment 44 and second attachment 46 connect at the rear edges 30 of cover portions 18. It will be understood that first attachment 44 and second attachment 46 may also connect to base portion 12, or to both base portion 12 and cover portion 18. Referring to FIG. 9, curb front end 32 has one or more drainage outlets 38 situated adjacent to and above front edge 24 of base portion 12. Drainage outlets 38 permit water to drain from within cavity 34. By providing drains 38 above front edge 24, this allows water to drain directly out without any blockages. There may be holes or other openings in base portion 12 that permit some drainage to occur, however it has been found that draining solely out the bottom may saturate the ground such that no further water can drain or that may cause heaving when the ground freezes. By draining out front edge 24, water is allowed to drain along the natural grade of the landscaping. It will be noted that the cross-sectional area of drains 38 is significantly larger than any holes or openings that may be present in base portion 12, and in addition, do not have any blockages, such that the majority of water will naturally flow out drains 38. Furthermore, if the ground becomes saturated for any reason, which may occur due to external factors, water will continue to flow out drains 38.

Figure 8:
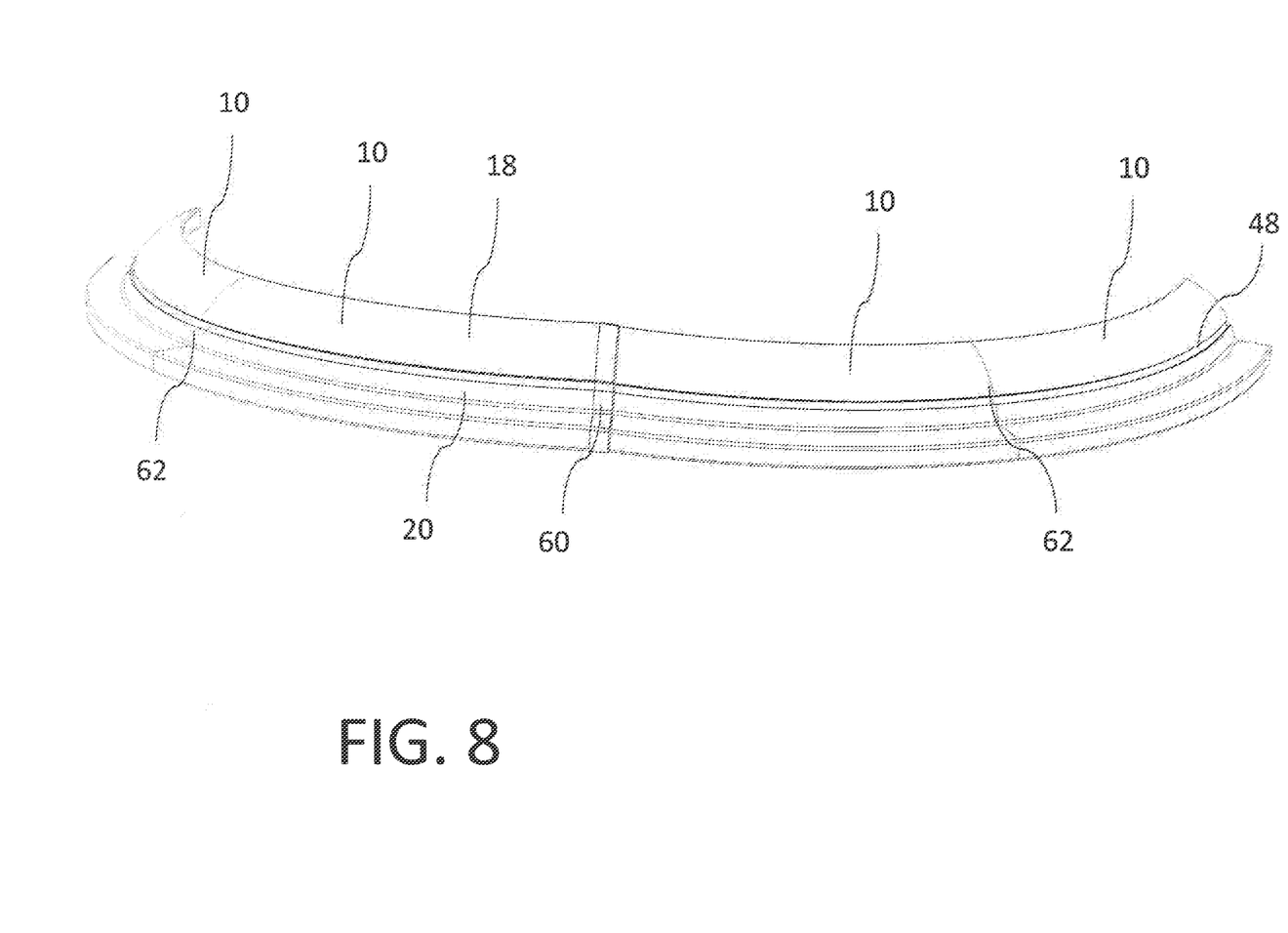
FIG. 8 is a front perspective view of curbs for landscaping attached together.

Curb 10 is preferably made so that it connects to other adjacent lengths of curb 10, as shown in FIG. 8 to make a landscaping feature. Curbs 10 may also have various shapes, such as straight, curved in or out, or may have various angles or corners, or curves at different radii of curvature. In doing so, this allows multiple curbs 10 to be attached together to form various shapes and designs, such as enclosures shaped as a circle, square, rectangle, or other shape, or borders with curves, straight sections, or the like, as will be understood by those skilled in the art.

As will be understood, drainage outlets 38 are not required for all sections of curb 10, or along the entire length. For example, those that are facing up the grade will not be in a position to drain, or could possibly allow water to drain into curb 10 instead of out. Accordingly, it is preferred that only a portion of curb 10 as assembled includes drains 38. This may be done, for example, by providing drainage outlets 38 in only a portion of a curb 10, such as is shown in FIG. 9, or by providing drainage outlets 38 in some curbs 10 but not others that are used in making a landscaping features, or by allowing curbs 10 with drainage outlets 38 to be cut to size. For example, a straight section of curb 10 may be provided with drainage outlets 38 along its length, and designed such that a user may cut off the necessary length to fit the design and provide the required number of drains 38 for the landscape feature and in the desired location. In this way, the preferred landscape feature made from curbs 10 would include a series of lengths of curbs 10 connected end to end, where one or more curbs 10 were without drains 38, and one or more curbs 10 were provided with drains 38.

Figure 6:
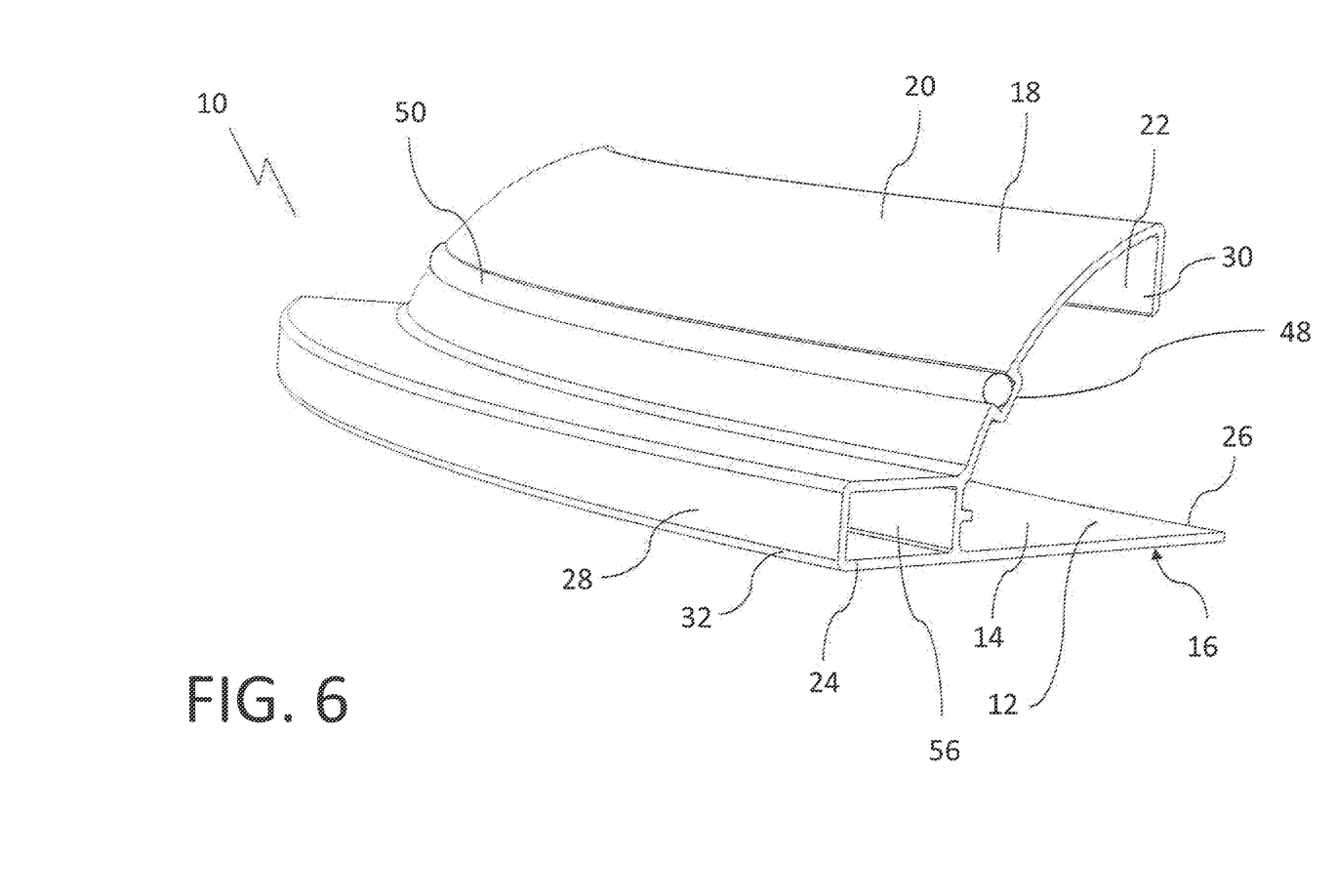
FIG. 6 is a front perspective view of a curb for landscaping with a lighting device in a recess.

Curb 10 may be designed to receive other features and design elements. Referring to FIG. 6, cover portion 18 may have a recess 48 to receive a lighting device 50. This lighting device 50 may take a number of forms, as known to those skilled in the art. For example, lighting device 50 may be a weather resistant tube of LED lights, as shown in FIG. 6.

Figure 7:
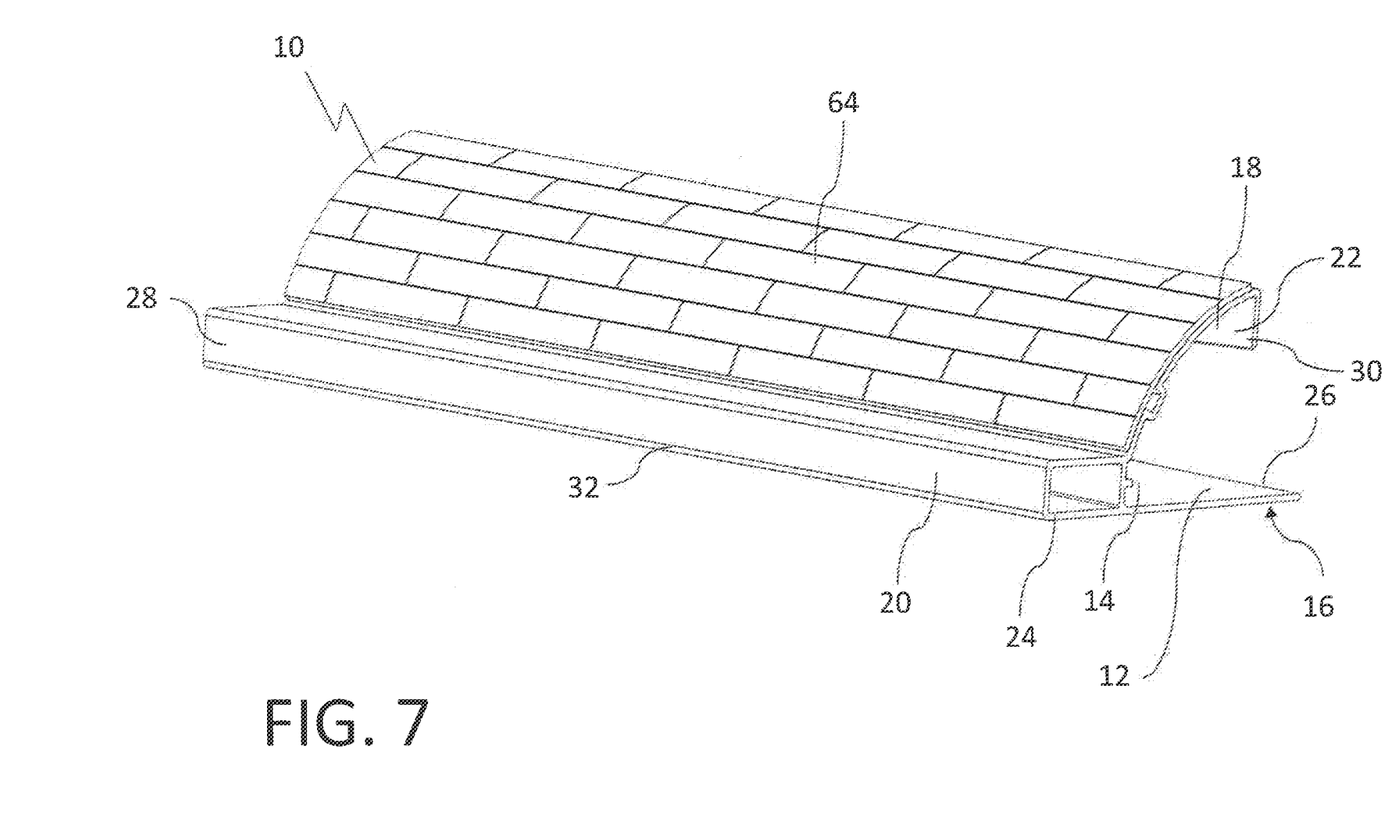
FIG. 7 is a front perspective view of a curb for landscaping with an attached decorative insert.

Referring to FIG. 7, cover portion 18 may also have a decorative insert 64 covering outer surface 20 of cover portion 18. This decorative insert 64 may, for example, give curb 10 the appearance of bricks or stonework.

Figure 2:
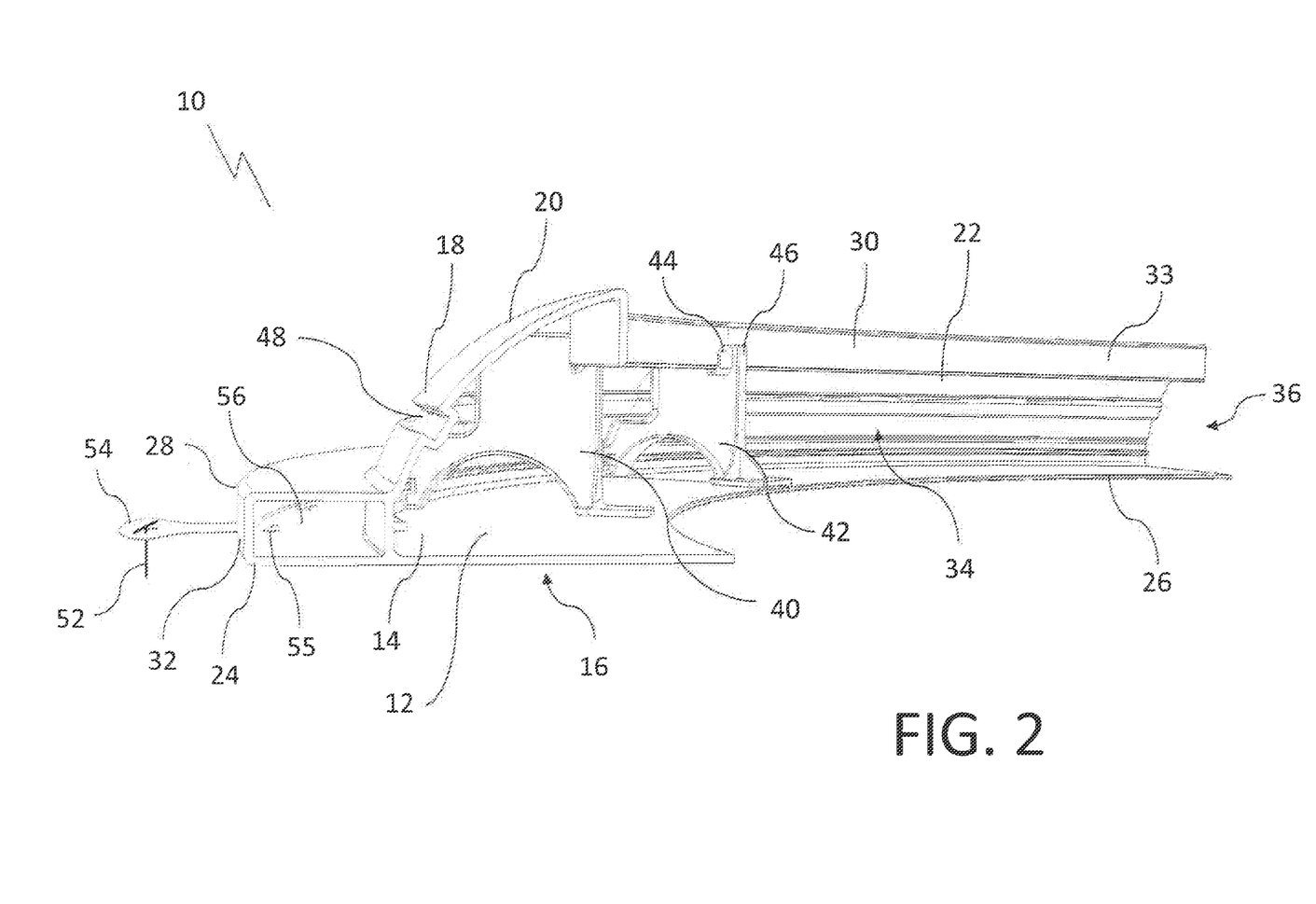
FIG. 2 is a side elevation view of a curb for landscaping.
Figure 3:
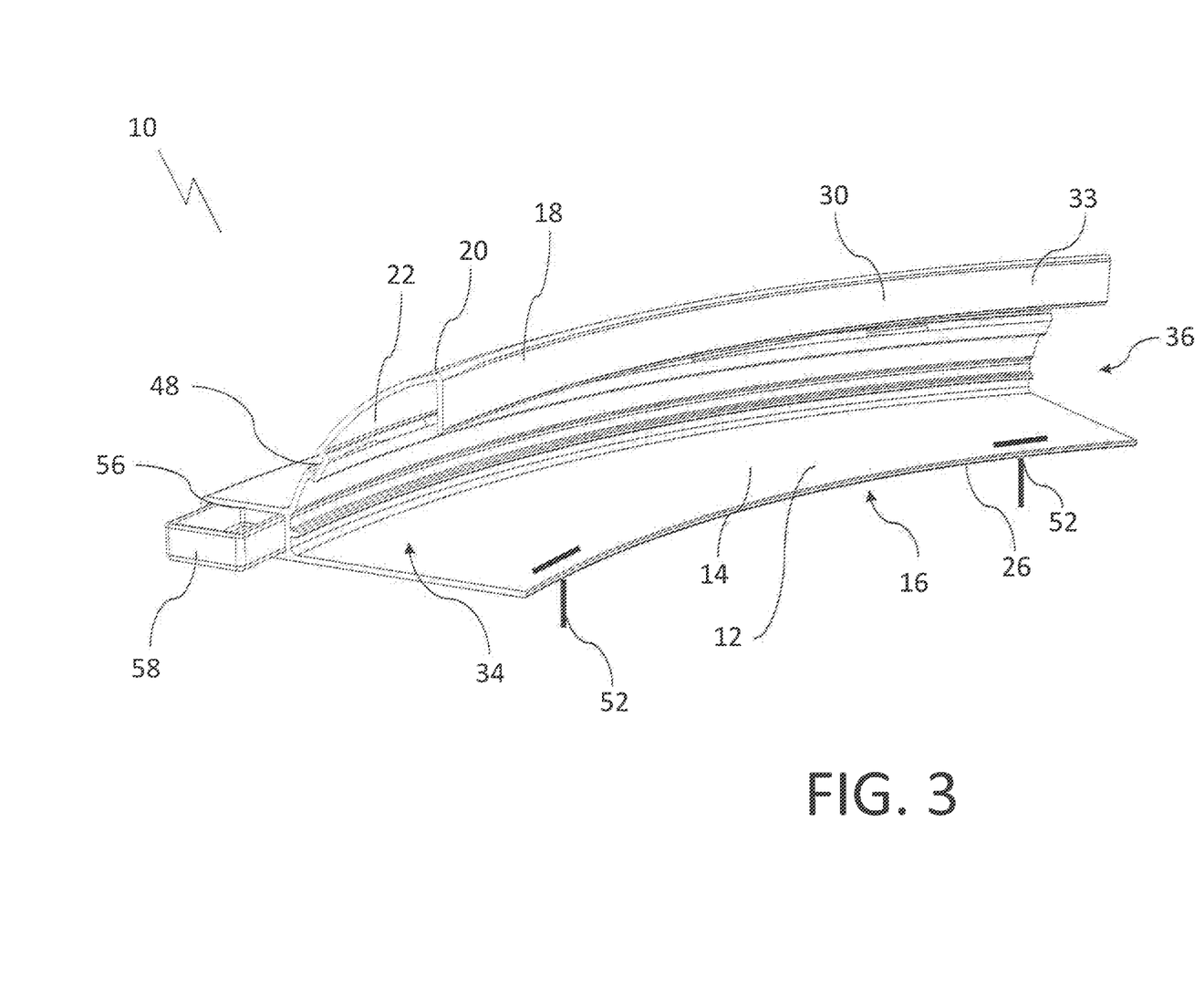
FIG. 3 is a rear perspective view of a curb for landscaping with an insert.

In order to install curb 10, base portion 12 may be placed on the ground surface and held in place by the weight of the material that fills cavity 34 of curb 10. This is done by filling curb 10 by inserting material at the rear edge 30. Alternatively, base portion 12 may be weighted to prevent movement of curb 10, which may be integrally formed, or again inserted into the inner cavity of curb 10. This may be the case if, for example, the fill material of the landscape feature will be a lightweight material such as wood chips that is incapable of properly anchoring curb 10, in which case washed rock or other heavy materials may be placed within cavity 34. In another alternative, base portion 12 may be attached or anchored to the ground surface. This may be accomplished using a number of techniques known in the art, for example, using stakes. Referring to FIG. 3, the base portion 12 may be attached to the ground surface with spikes 52, where spikes 52 pass through base portion 12 and into the ground surface. Referring to FIG. 2, base portion 12 may have straps 54 that are designed to extend past front edge 24. These straps 54 may be attached to base portion 12 using apertures 55. Straps 54 are also secured to the ground surface by passing spikes 52 through them and into the ground surface in order to anchor front edge 24 to the ground surface. As straps 54 are flexible, they are able to bend as spikes 52 are passed through them, such that spikes 52 may be driven further into the ground to hide below the top surface, and also to increase the tension applied to curb 10. By inserting spikes 52 at rear edge 30 and anchoring straps 54 at front edge 24, curb 10 can be securely anchored to the ground.

Curb 10 may be attached to adjacent curbs in various ways. Preferably, curb 10 has a consistent cross-section that allows it to be cut to any size and still be able to be attached to adjacent curb sections 10. This allows large lengths of curbs 10 to be manufactured and custom-sized on site. This is made possible by providing attachments that do not require anything other than a consistent cross-section, examples of which will now be described.

Figure 5:
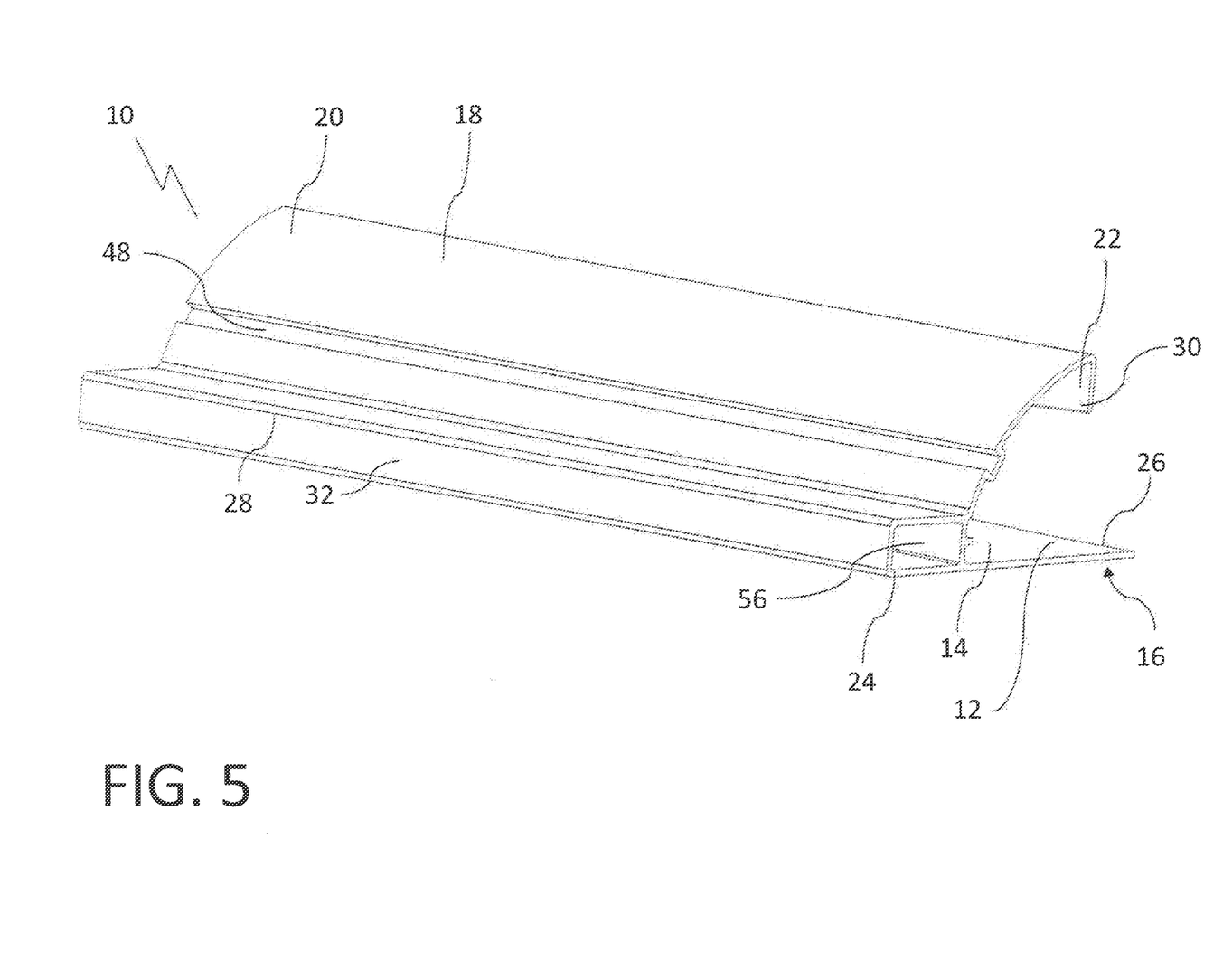
FIG. 5 is a front perspective view of a straight length of curb for landscaping.

As shown in FIG. 3, curb 10 may have an attachment cavity 56 along curb front end 32. In a preferred embodiment, attachment cavity 56 receives an insert 58 that is sized to be received within attachment cavity 56. Insert 58 is sized and installed such that a portion of insert 58 is received by each of two attachment cavities 56, allowing for adjoining lengths of curb 10 to be attached. Noted above and as shown in FIG. 1, there may be joint brackets 42 that both support cover portion 18 and secure both curbs 10. Join brackets 42 have first and second attachment sides 44 and 46 that grip each curb 10, respectively. Preferably, this is a frictional engagement or a tongue and groove-type connection. Referring to FIG. 8, in order to hide or protect the seam on the outside of adjacent curbs 10, adjoining lengths of curb 10 may also be attached with a clip seam 60. Clip seam 60 covers a portion of outer surface 20 of cover portion 18 of each length of curb 10. Clip seam 60 serves to cover a seam 62 between adjoining lengths of curb 10. As will be understood by one skilled in the art, any of the attachment devices previously discussed may be used to attach adjoining lengths of curb 10, or any combination of attachment devices. Curb 10 may be constructed with a variety of techniques known in the art, including, for example, injection moulding, extrusion, blow moulding or pultrusion. Curb 10 may further be constructed from any material known in the art, for example, steel, aluminium, sheet metal, galvanized steel, plastic, rubber, or composite materials. It will be understood that curb 10, as described, may have lengths that take a variety of shapes, including straight, as shown in FIG. 5, and curved, as shown in FIG. 1. Lengths 10 may also have corners or take any other shape that it is known in the art to use for landscaping curbs.

Operation:

Lengths of curb for landscaping 10 in shapes that are to be used for creating a landscape feature are provided in order to define the borders of an area to be landscaped. Base portion 12 and cover portion 18 define a cavity 34 as shown in FIG. 1, with an opening 36. The cover portion 18 has a drainage outlet 38 shown in FIG. 9 that permits water to drain from the cavity 34. The lengths of curb 10 are assembled such that the cavity 34 of the curbs 10 open towards the area to be landscaped. Assembly of curbs 10 may include the use of various methods of attachment and support. For example, referring to FIG. 1, support brackets 40 may be placed within cavity 34 such that they resist movement of the cover portion 18 towards the base portion 12. Join brackets 42 may be placed between lengths of curb 10 such that they attach to the lengths of curb 10 using a first attachment 44 and a second attachment 46. Join brackets 42 also resist movement of the respective cover portions 18 towards the base portions 12. Lengths of curb 10 may also be connected using glue, screws, clips, tie straps or other methods known in the art. Referring to FIG. 3, the base portion 12 may be attached to the ground surface by passing nails 52 through the base portion 12 and into the ground surface. Base portion 12 may also have straps 54 extending past the front edge 24. These straps may also be attached to the ground surface by passing nails 52 through the straps 54 and into the ground surface. If curbs 10 have attachment cavity 56, they may be connected using insert 58. Insert 58 is fitted into attachment cavity 56 of one length of curb such that a portion of insert 58 is contained within attachment cavity 56, and the other portion of insert 58 is exposed such that it can be fit into another attachment cavity 56, joining the two curbs 10 by the insert. Adjoining curbs 10 may also be connected with a clip seam 60 as shown in FIG. 8. In order to attach clip seam 60, curbs 10 are placed in contact such that they define seam 62. Clip seam 60 is placed over seam 62, attaching to either curb 10 along seam 62. This allows clip seam 60 to conceal the seam 62 along the outer surface 20 of the cover portion 18. Cover portion 18 may optionally have a recess 48 to receive a lighting device 50 as shown in FIG. 6. Referring to FIG. 7, there may also be a decorative insert 64 that is attached to the outer surface 20 of the cover portion 18. It will be understood that this cover portion may be attached using a variety of methods known in the art, for example, adhesives. After assembly of curbs 10 using any combination of attachment methods as previously discussed, curbs 10 will form a closed shape around the area to be landscaped. A landscaping material is then deposited on the area to be landscaped and in the cavity 34 of the curb 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A curb for landscaping, the curb comprising:
   a curb body comprising a base portion, a cover portion, a curb front end and a curb rear end, wherein:
   the base portion has a top surface and a bottom surface, the bottom surface being flat;
   the cover portion has an outer surface and an inner surface;
   each of the base portion and the cover portion have front and rear edges, the front edge of the base portion being attached to the front edge of the cover portion and defining the curb front end, the cover portion overlying and extending above the base portion from the curb front end such that the rear edge of the cover portion is spaced above the rear edge of the base portion;
   the curb rear end comprises one or more drainage openings above the top surface of the base portion; and
   the curb front end comprises one or more drainage outlets adjacent to and above the front edge of the base portion, the one or more drainage outlets being in fluid communication with the one or more drainage openings and permitting water to drain through the curb body.

2. The curb of claim 1, wherein the one or more drainage openings comprises one opening defined by the rear edge of the base portion and the cover portion and the curb body is hollow.

3. The curb of claim 1, wherein the cover portion and the base portion are connected by a support bracket, the support bracket resisting movement of the cover portion toward the base portion.

4. The curb of claim 3, wherein the support bracket is a join bracket, the join bracket comprising first and second attachments that permit connections between adjoining lengths of curb.

5. The curb of claim 1, wherein the cover portion comprises a recess to receive a lighting device.

6. The curb of claim 1, wherein the base portion is attached to a ground surface with nails passing through the base portion.

7. The curb of claim 6, wherein the base portion comprises straps extending past the front edge.

8. The curb of claim 1, further comprising:
   an attachment cavity along the curb front end; and
   an insert that is sized to be received within the attachment cavity, the insert permitting the curb to be attached to adjoining lengths of curb.

9. The curb of claim 1, wherein adjoining lengths of curb are attached with a clip seam, the clip seam covering the outer surface of the cover portion at a seam between adjoining lengths of curb.

10. The curb of claim 1, wherein the curb is constructed through one of injection moulding, extrusion, blow moulding and pultrusion.

11. The curb of claim 1, wherein the curb is made from materials selected from a group consisting of steel, aluminium, sheet metal, galvanized steel, plastic, rubber and composite materials.

12. The curb of claim 1, wherein the cover portion comprises a decorative insert covering the outer surface.

13. A method of creating a landscape feature, the method consisting of:

providing a curb for landscaping to define the borders of an area to be landscaped, the curb comprising:
  a base portion having a top surface and a bottom surface, the bottom surface being flat;
  a cover portion having an outer surface and an inner surface;
  wherein each of the base portion and the cover portion having front and rear edges, the rear edges of the base portion and the cover portion defining a curb rear end and the front edge of the base portion being attached to the front edge of the cover portion and defining a curb front end, the cover portion overlying and extending above the base portion from the curb front end such that the rear edge of the cover portion is spaced above the rear edge of the base portion; and
  one or more drainage openings in the curb rear end and above the top surface of the base portion; and
  one or more drainage outlets in the curb front end adjacent to and above the front edge of the base portion, the one or more drainage outlets being in fluid communication with the one or more drainage openings and permitting water to drain through the curb body;
  assembling the curb such that the one or more drainage openings open toward the area to be landscaped; and
  depositing a landscaping material on the area to be landscaped.

14. The method of claim 13, wherein the one or more drainage openings comprises one opening defined by the rear edge of the base portion and the cover portion and the curb body is hollow.

15. The method of claim 14, wherein the landscaping material is further deposited in the cavity of the curb for landscaping.

16. The method of claim 13, further comprising the step of connecting the cover portion and the base portion using a support bracket, the support bracket resisting movement of the cover portion toward the base portion.

17. The method of claim 16, wherein the support bracket is a join bracket, the join bracket comprising first and second attachments that permit connections between adjoining lengths of curb.

18. The method of claim 13, wherein the cover portion comprises a recess to receive a lighting device.

19. The method of claim 13, further comprising the step of attaching the base portion to a ground surface with nails passing through the base portion.

20. The method of claim 19, wherein the base portion comprises straps extending past the front edge.

21. The method of claim 13, the curb further comprising:
  an attachment cavity along the curb front end; and
  an insert that is sized to be received within the attachment cavity, the insert permitting the curb to be attached to adjoining lengths of curb.

22. The method of claim 13, further comprising the step of attaching adjoining lengths of curb with a clip seam, the clip seam covering the outer surface of the cover portion at a seam between adjoining lengths of curb.

23. The method of claim 13, wherein the curb is constructed through one of injection moulding, extrusion, blow moulding, and pultrusion.

24. The method of claim 13, wherein the curb is made from materials selected from a group consisting of steel, aluminium, sheet metal, galvanized steel, plastic, rubber or composite materials.

25. The curb of claim 13, wherein the front portion comprises a decorative insert covering the outer surface.

26. A curb system for landscaping, the curb system comprising:
  providing a plurality of lengths of landscaping curb, each length of landscaping curb comprising:
    a base portion having a top surface and a bottom surface, the bottom surface being flat;
    a cover portion having an outer surface and an inner surface;
    wherein each of the base portion and the cover portion have front and rear edges, the rear edges of the base portion and the cover portion defining a curb rear end and the front edge of the base portion being attached to the front edge of the cover portion and defining a curb front end, the cover portion overlying and extending above the base portion from the curb front end such that the rear edge of the cover portion is spaced above the rear edge of the base portion; and
    one or more drainage openings in the curb rear end and above the top surface of the base portion; and
  wherein at least one of the lengths of landscaping curb comprises one or more drainage outlets in the curb front end, adjacent to and above the front edge of the base portion, the one or more drainage outlets being in fluid communication with the one or more drainage openings and permitting water to drain from the curb system.

27. The curb system of claim 26, wherein the one or more drainage openings comprises one opening defined by the rear edge of the base portion and the cover portion and the curb body is hollow.

28. The curb system of claim 26, wherein the cover portion and the base portion are connected by a support bracket, the support bracket resisting movement of the cover portion toward the base portion.

29. The curb system of claim 28, wherein the support bracket is a join bracket, the join bracket comprising first and second attachments that permit connections between adjoining lengths of curb.

30. The curb system of claim 26, wherein the cover portion comprises a recess to receive a lighting device.

31. The curb system of claim 26, wherein the base portion is attached to a ground surface with nails passing through the base portion.

32. The curb system of claim 31, wherein the base portion comprises straps extending past the front edge.

33. The curb system of claim 26, further comprising:
  an attachment cavity along the curb front end; and
  an insert that is sized to be received within the attachment cavity, the insert permitting the curb to be attached to adjoining lengths of curb.

34. The curb system of claim 26, wherein adjoining lengths of curb are attached with a clip seam, the clip seam covering the outer surface of the cover portion at a seam between adjoining lengths of curb.

35. The curb system of claim 26, wherein the lengths of curb are constructed through one of injection moulding, extrusion, blow moulding and pultrusion.

36. The curb system of claim 26, wherein the lengths of curb are made from materials selected from a group consisting of steel, aluminium, sheet metal, galvanized steel, plastic, rubber or composite materials.

37. The curb of claim 26, wherein the front portion comprises a decorative insert covering the outer surface.

38. The curb of claim 1, wherein the top surface of the base portion comprises a drainage surface.

39. The curb system of claim 26, wherein the top surface of the base portion comprises a drainage surface.

* * * * *